United States Patent
Stevens

(10) Patent No.: US 6,663,136 B2
(45) Date of Patent: Dec. 16, 2003

(54) COUPLING FOR TRAILER

(76) Inventor: James E. Stevens, 2 George Street, Lindsay, Ontario (CA), K9V 1W1

( * ) Notice: Subject to any disclaimer, the term of this patent is extended or adjusted under 35 U.S.C. 154(b) by 0 days.

(21) Appl. No.: 10/042,228

(22) Filed: Jan. 11, 2002

(65) Prior Publication Data

US 2002/0093173 A1 Jul. 18, 2002

(51) Int. Cl.$^7$ ................................................. B60D 1/52
(52) U.S. Cl. ..................................... 280/511; 280/47.27
(58) Field of Search .................................. 280/504, 511, 280/476.1, 47.17, 47.27, 47.28, 47.29, 47.11

(56) References Cited

U.S. PATENT DOCUMENTS

| | | | | |
|---|---|---|---|---|
| 2,809,759 A | * | 10/1957 | Manker | ........................ 214/620 |
| 3,622,181 A | * | 11/1971 | Smith | .......................... 280/476 |
| 4,318,448 A | * | 3/1982 | Cline | ........................ 180/14 C |
| 4,566,708 A | * | 1/1986 | Specie | .................. 280/47.13 R |
| 5,071,151 A | * | 12/1991 | Irwin | .......................... 280/402 |
| 5,927,730 A | * | 7/1999 | Sattler | .................... 280/47.131 |
| 6,024,374 A | * | 2/2000 | Friesen | ........................ 280/511 |
| 6,419,244 B2 | * | 7/2002 | Meabon | .................... 280/47.27 |

* cited by examiner

*Primary Examiner*—Avraham Lerner
(74) *Attorney, Agent, or Firm*—Birch, Stewart, Kolasch & Birch, LLP

(57) ABSTRACT

The coupling interconnects a trailer and a conventional hand-held two-wheeled cart. The coupling includes a frame to which a ball of a ball and socket joint is connected. The frame has a recess which is adapted to removably receive the forward portion of a lower plate of the cart. The coupling is connected to the cart by inserting the forward portion into the recess. The coupling is then positioned such that its ball is beneath the socket on the hitch of the trailer. When the cart is tipped backward, the ball rises and enters the socket and lifts the hitch thereby permitting the trailer to be moved by the cart.

8 Claims, 2 Drawing Sheets

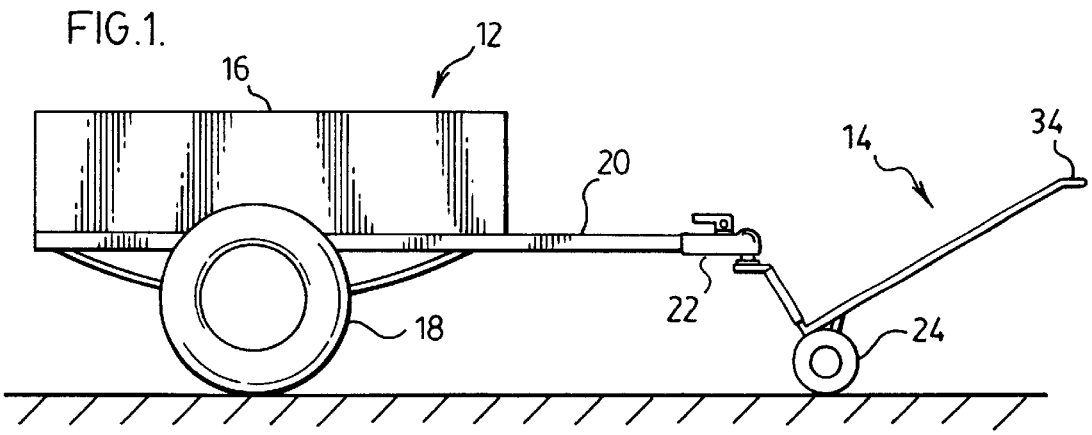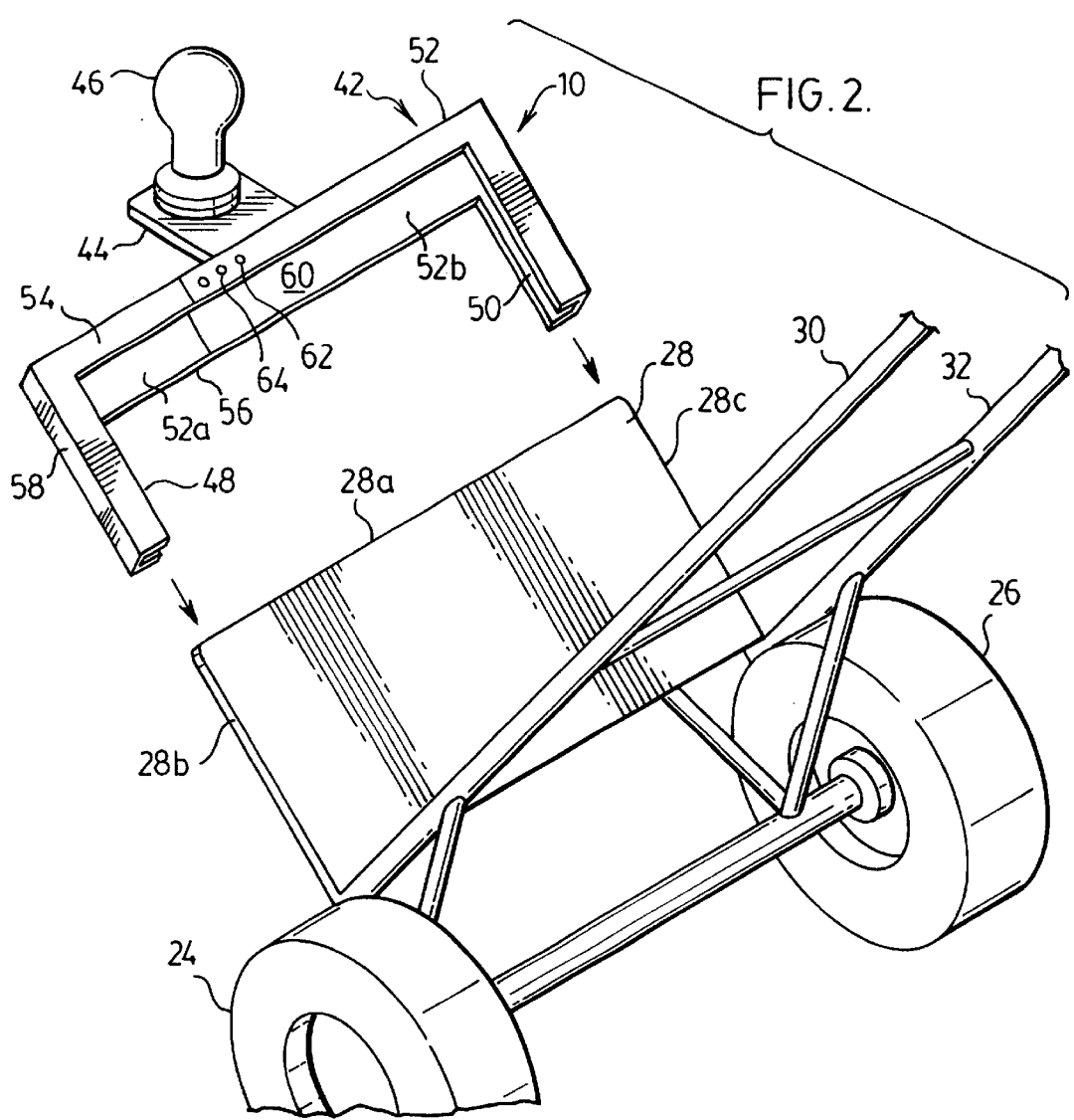

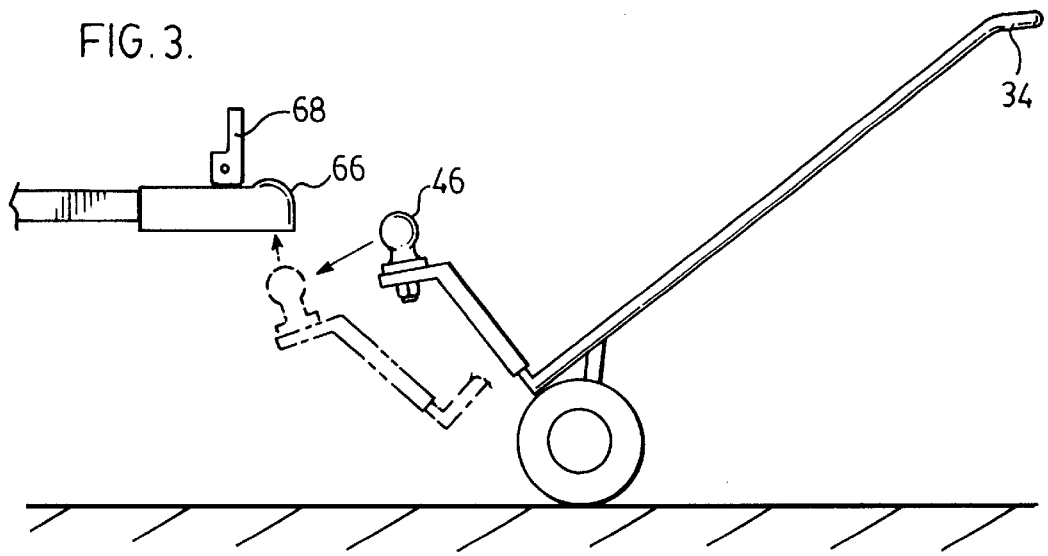
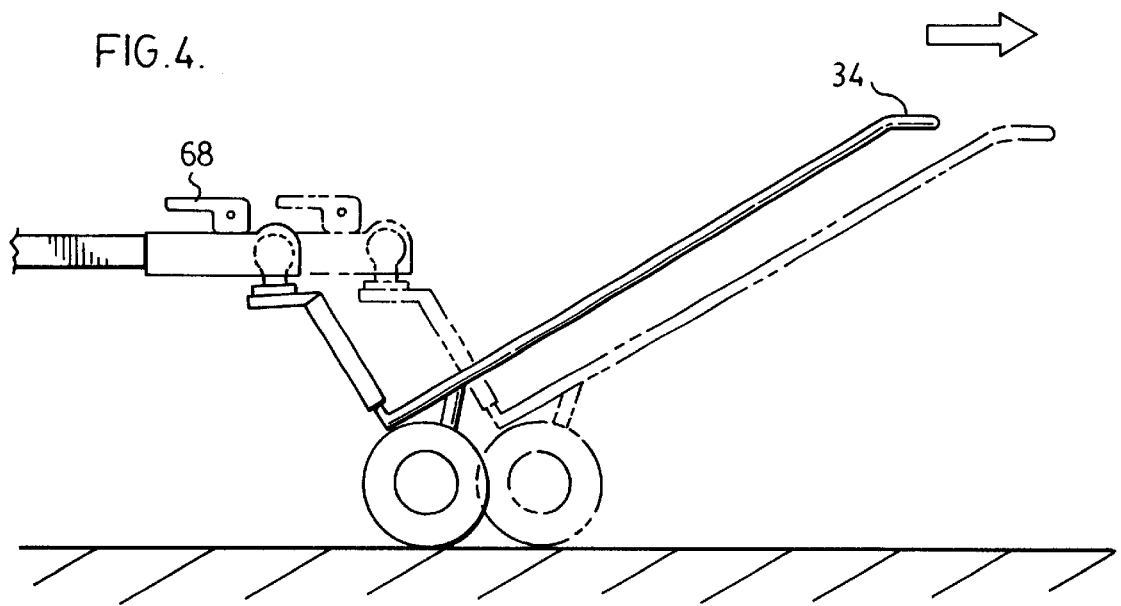

COUPLING FOR TRAILER

BACKGROUND OF THE INVENTION

This invention relates to couplings and more particularly to a coupling for interconnecting a trailer and a hand-held two-wheeled cart whereby the trailer may be moved by means of the cart.

Trailers which are towed by motor vehicles usually consist of a box mounted to an axle having a wheel at either end. The trailer has a hitch which has a socket at its forward end and the socket interconnects with a ball on a tongue which is welded to the frame of the vehicle.

A shortcoming of such trailers is that they are difficult to move by hand. It is often more convenient to move them by this means yet it is often impossible to do so. Should it be necessary, for example, to move a trailer a short distance, or move a trailer whose hitch is blocked by some obstruction, it is often more convenient to move them by hand yet the design of the trailer does not usually permit this.

SUMMARY OF THE INVENTION

I have found that a trailer can be easily moved by a hand-held two-wheeled cart conventionally used to move appliances and the like if the trailer and cart are interconnected by means of a coupling of my design. The coupling is provided with a recess for connecting it to a cart and a ball for connecting it to the hitch of the trailer. When the trailer and cart are interconnected, the cart can be tipped to raise the hitch. The trailer can then be easily moved by pushing or pulling the cart in the usual manner.

The coupling of my invention interconnects a hand-held two-wheeled cart and a trailer having a hitch provided with a socket for receipt of a ball. The cart has an upper handle and a lower plate on which a load to be carried is seated.

The coupling of my invention comprises a frame having a recess adapted to removably accommodate the outer edge of the plate; a tongue connected to the frame and extending outwardly therefrom; and a ball connected to the tongue. The coupling is arranged and constructed such that the frame can be connected to the lower plate by insertion of the forward edge into the recess and when so connected the coupling can be positioned such that the ball is beneath the socket. When the handle of the cart is tipped backward away from the trailer, the ball rises and enters the socket and lifts the hitch thereby permitting the trailer to be moved by means of the cart.

DESCRIPTION OF THE DRAWINGS

The coupling of the invention is described with reference to the accompanying drawings in which:

FIG. 1 is an elevation of the coupling together with a trailer and a hand-held two-wheeled cart;

FIG. 2 is a perspective view of the coupling and cart;

FIG. 3 is an elevation of the coupling, cart and trailer showing the manner in which the cart is attached to the hitch of the trailer; and FIG. 4 is an elevation of the coupling, cart and trailer showing the manner in which the coupling facilitates the moving of the trailer.

Like reference characters refer to like parts throughout the description of the drawings.

DESCRIPTION OF THE PREFERRED EMBODIMENT

With reference to FIGS. 1 and 2, the coupling of the invention, generally 10 is shown in conjunction with a trailer, generally 12, and a hand-held two-wheeled cart 14. The trailer is of conventional construction and has a box 16 mounted above a pair of wheels 18. A tongue 20 extends forward of the box and a hitching assembly 22 is mounted at the forward end of the tongue. The hitching assembly is provided with the usual socket for receipt of a ball fastened to a vehicle used for towing the trailer.

The cart is a two-wheeled cart of conventional construction. The cart is held and operated by hand and is used to transport heavy appliances and the like. The cart has a pair of wheels 24, 26 mounted to a framework which includes a lower plate 28 on which a load is seated. A pair of spaced rods 30, 32 extend upwardly from the lower plate and terminate at a handle 34.

The coupling of the invention is made up of a frame, generally 42, a tab 44 and a ball 46. The frame is generally U-shaped having a pair of spaced lateral portions 48, 50 and an intermediate portion 52 which extends between the lateral portions. Each portion of the frame is made up of a channel having a pair of spaced upper and lower walls 54, 56 and a central wall 58 which extends between the other two walls. The three walls define a hollow recess 60.

The intermediate portion of the frame is composed of two segments 52a,b which slide together and apart. Both segments have a number of openings 62 spaced along their lengths for receipt of a conventional locking pin 64 so that the two segments can be locked together to prevent them from sliding relative to each other.

Tab 44 extends outwardly from the intermediate portion of the frame approximately mid-way between its two ends. The tab extends at an oblique angle from the plane of the upper wall 54 of the frame. Ball 46 is bolted to the tab.

The coupling is attached to the lower plate 28 of the cart by inserting the forward edge 28a of the plate into recess 60 in the intermediate portion 52 of the frame. The effective length of the intermediate portion is adjusted by means of locking pin 64 until that the side edges 28b,c of the plate fit into the recesses in the lateral portions of the frame. The coupling can thus be connected to carts having various sizes of lower plates.

When the coupling is connected in this manner, tab 44 extends outwardly from the front of the plate and, as illustrated in FIG. 3, maybe inserted into socket 66 in the hitching assembly of the trailer. Preferably the tongue of the trailer is held horizontal while the coupling is being connected. A block of wood may be used for this purpose. There will then be sufficient room for the ball beneath the socket.

With reference to FIG. 4, the cart is positioned such that the ball is located directly beneath the socket. When the handle of the cart is tipped backward, the ball rises and enters the socket. Further tipping of the cart will cause the hitch to rise until the tongue is approximately horizontal. The angle of the tab is adjusted such that when the tongue is horizontal, the handle of the cart will be at a level at which an adult of average height, while erect, may comfortably push or pull the cart. As the adult does so, the trailer will move as illustrated in broken lines in FIG. 4.

The ball maybe held within the socket by conventional means to prevent unintended separation of the ball from the socket when the cart is being used to move the trailer. A conventional lock 68 for this purpose is illustrated schematically in FIGS. 3 and 4.

It will be understood of course that modifications can be made in the coupling illustrated and described herein without departing from the scope of the invention as defined in the appended claims.

I claim:

1. A coupling for interconnecting a hand-held two-wheeled cart to a trailer having a hitch provided with a socket for receipt of a ball, said cart having a lower plate on which a load to be carried is seated, said lower plate having a forward edge and oppositely facing side edges, said coupling comprising:

a frame having a recess adapted to removably accommodate said forward and side edges of said lower plate; a tab connected to said frame and extending outwardly therefrom; and a ball connected to said tab, said coupling being arranged and constructed such that said frame can be held in contact with said lower plate solely and exclusively by insertion of said forward and side edges into said recess and when so held in contact said coupling can be positioned such that said ball is beneath said socket and when the handle of said cart is tipped backward away from said trailer, said ball rises and enters said socket and lifts said hitch thereby permitting said trailer to be moved.

2. The coupling as claimed in claim 1 wherein said frame is generally U-shaped having a pair of spaced lateral portions and an intermediate portion which extends therebetween, each said portion being made up of a channel having a pair of spaced upper and lower walls and a central wall which extends therebetween, said walls defining said hollow recess, the portion of said recess in said intermediate portion being adapted to receive said forward edge of said lower plate and the portion of said recess in said lateral portions being adapted to receive oppositely facing side edges of said lower plate.

3. The coupling as claimed in claim 1 wherein the angle between said walls and said tab is adjusted such that when said hitch is lifted by said ball, said handle will be at a level at which an adult of average height, while erect, may push or pull said cart.

4. The coupling as claimed in claim 2 wherein said intermediate portion is composed of two segments which slide together and apart such that the effective length of said intermediate portion can be adjusted to accommodate various sizes of said lower plate, said coupling further including locking means for selectively preventing said segments from sliding.

5. A coupling for interconnecting a hand-held two-wheeled cart to a trailer having a hitch provided with a socket for receipt of a ball, said cart having a lower plate on which a load to be carried is seated, said lower plate having a forward edge and oppositely facing side edges, said coupling comprising:

a frame made up of a channel having upper and lower walls separated by a space which defines a recess which opens in a forward direction to removably accommodate said forward and side edges of said lower plate; a tab connected to said frame and extending outwardly therefrom in a direction opposite said forward direction and at an oblique angle relative to said walls, and a ball connected to said tab, said coupling being arranged and constructed such that said frame can be held in contact with said lower plate solely and exclusively by insertion of said forward and side edges into said recess and when so connected said coupling can be positioned such that said ball is beneath said socket and when the handle of said cart is tipped backward away from said trailer, said ball rises and enters said socket and lifts said hitch thereby permitting said trailer to be moved.

6. A coupling for interconnecting a hand-held two-wheeled cart to a trailer having a hitch provided with a socket for receipt of a ball, said cart having a lower plate on which a load to be carried is seated, said coupling comprising:

a frame having a recess adapted to removably accommodate a forward edge of said lower plate; a tab connected to said frame and extending outwardly therefrom; and a ball connected to said tab, said coupling being arranged and constructed such that said frame can be connected to said lower plate by insertion of said forward edge into said recess and when so connected said coupling can be positioned such that said ball is beneath said socket and when the handle of said cart is tipped backward away from said trailer, said ball rises and enters said socket and lifts said hitch thereby permitting said trailer to be moved, wherein said frame is generally U-shaped having a pair of spaced lateral portions and an intermediate portion which extends therebetween, each said portion being made up of a channel having a pair of spaced upper and lower walls and a central wall which extends therebetween, said walls defining said hollow recess, the portion of said recess in said intermediate portion being adapted to receive said forward edge of said lower plate and the portion of said recess in said lateral portions being adapted to receive oppositely facing side edges of said lower plate.

7. The coupling as claimed in claim 6, wherein said intermediate portion is comprised of two segments which slide together and apart such that the effective length of said intermediate portion can be adjusted to accommodate various sizes of said lower plate, said coupling further including locking means for selectively preventing said segments from sliding.

8. A coupling for interconnecting a hand-held two-wheeled cart to a trailer, said coupling comprising:

a generally U-shaped frame having a pair of spaced lateral portions and an intermediate portion which extends therebetween, each said portion being made up of a channel having a pair of spaced upper and lower walls and a central wall which extends therebetween, said walls defining a hollow recess for removable receipt of a load-supporting platform of said cart; a tab connected to said frame and extending outwardly therefrom; and a ball connected to said tab for removable receipt into a socket in a hitch of said trailer, wherein said intermediate portion is comprised of two segments which slide together and apart such that the effective length of said intermediate portion can be adjusted to accommodate various sizes of said lower plate, said coupling further including locking means for selectively preventing said segments from sliding.

* * * * *